May 6, 1924.                                                    1,493,171
H. G. R. VULLIET ET AL
SHEARS
Filed Nov. 2, 1922                              3 Sheets-Sheet 1

INVENTORS
HUBERT G. R. VULLIET
FRANÇOIS A. H. DESCHÂTRES
BY
Lotka, Kehlenbeck & Mathé
ATTORNEYS May 6, 1924.  
H. G. R. VULLIET ET AL  
1,493,171  
SHEARS  
Filed Nov. 2, 1922  
3 Sheets-Sheet 2
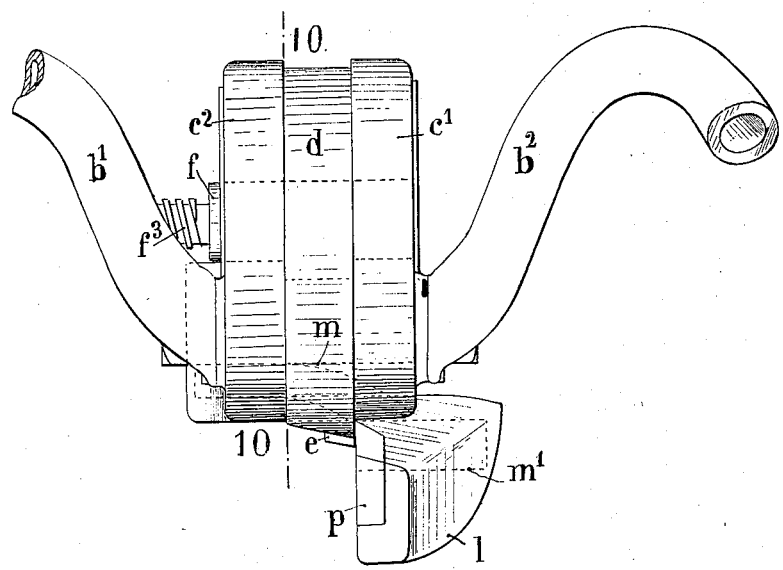
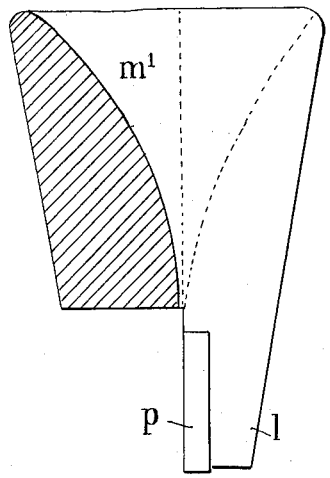
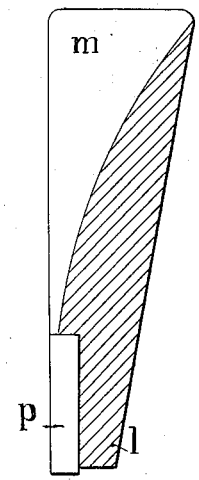
INVENTORS  
HUBERT G.R. VULLIET  
FRANÇOIS A.H. DESCHÂTRES  
BY  
*Lotka, Kehlenbeck & Mathi*  
ATTORNEYS May 6, 1924.

H. G. R. VULLIET ET AL 1,493,171

SHEARS

Filed Nov. 2, 1922   3 Sheets-Sheet 3

INVENTORS
HUBERT G.R. VULLIET
FRANÇOIS A.H. DESCHÂTRES
BY
*Lotha, Kehlenbeck & Mathé*
ATTORNEYS Patented May 6, 1924.

1,493,171

UNITED STATES PATENT OFFICE.

HUBERT GASTON RAPHAEL VULLIET AND FRANÇOIS ALEXIS HENRI DESCHÂTRES, OF PARIS, FRANCE, ASSIGNORS TO ANDRÉ GUENEAU, OF PARIS, FRANCE.

SHEARS.

Application filed November 2, 1922. Serial No. 598,474. REISSUED

*To all whom it may concern:*

Be it known that we, HUBERT GASTON RAPHAEL VULLIET, of 48 Rue de Cronstadt, in the city of Paris, Republic of France, and FRANÇOIS ALEXIS HENRI DESCHÂTRES, of 21 Rue de Cronstadt, in the city of Paris, Republic of France, have invented Shears, of which the following is a full, clear, and exact description.
In shears having a reciprocating movement, used up to this day, the relative feeding movement of the sheet-iron plate relatively to the shears is obtained either by means of a special device or by hand. The automatic feed, which, moreover, is not generally used, necessitates a mechanical complication which is costly in every case, and quite inadmissible with small fixed or portable shears. Consequently, in the latter, the feeding is always effected by hand; it results therefrom that the workman utilizing a machine of this kind is troubled by two preoccupations: to cause the tool (or the sheet-iron plate) to move forward at every stroke according to a predetermined extent slightly less than the length cut, to guide it for cutting according to the line traced. On the other hand, these shears can only cut according to a straight line and use must be made of nonportable circular shears for curved outlines.

This invention has for its object a new shears in which, by a very simple mechanism, the blade itself can take a bearing on the sheet-iron plate (or acts on the same) for effecting the necessary feeding movement.

In the shears forming the subject-matter of the invention, the movable blade, adapted to move on the cut sheet-iron plate which remains fixed, is obliquely secured on a blade-carrier directly mounted on the crank pin of a crank or of an eccentric to which is imparted a continuous circular movement and this blade-carrier is moreover shaped in such a manner as to slide in or on a shaft parallel to the axis of the driving crank.

This particular mechanism imparts to the movable blade two simultaneous movements:
1° a reciprocating movement for moving it towards and away from the fixed blade, movement by which the cutting operation is effected; 2° a reciprocating movement in the direction of the advance and recoil of the tool when, in this latter movement, the movable blade moves in the direction of the recoil during the cutting operation owing to its obliquity and to its keenness it cannot slide on the sheet-iron plate and, in consequence of the relative displacement of the blades, produces the advance of the tool.

According to a first form of construction, the movable blade-carrier mounted on the central bearing, which is out of center, of the driving shaft, is, on the other hand, extended on the side opposite to the blade, by a prismatic or cylindrical tail-piece which moves in a slide of a shaft arranged parallel and above the driving excentric, so that the elliptical movement imparted to the movable blade is such that the small axis of the ellipse is directed in the same direction as the edge of the blade and that the movement of relative displacement of the tool and of the material to be cut is small.

In a second form of construction, this movable blade-carrier is so devised as to present a very large guide surface, in order to ensure the displacement of the movable blade, rigorously in the same plane.

Moreover, the rocking axis of this blade-carrier is arranged at a point situated slightly below the axis of rotation of the excentric driving the blade-carrier, so that the elliptical movement of this latter is such that the large axis of the ellipse is directed in the same direction as the edge of the blade and that the movement of translation of the said blade is thus the maximum.

Finally, two curved slots are formed one above the other in the frame of the shears and symmetrically arranged relatively to the middle plane of the shears, with point of tangency slightly in front of the apex of the angle formed by the blades of the shears, so as to permit of turning the tool in both directions in very small radii and to obtain the cutting of curved outlines without distorting the material cut; these slots forming an oval opposed at the top to the cutting angle of the blades, so as to release the sheet-iron plate cut without distorting it.

In order that the invention may be clearly understood, two forms of construction forming the subject-matter of the said invention will be described hereafter, by way of example, with reference to the accompanying drawing in which:

Fig. 7 is a front elevation.

Fig. 8 is a side view.

Fig. 9 is a cross vertical section made according to line 9—9 of Fig. 8.

Fig. 10 is a longitudinal vertical section made according to line 10—10 of Fig. 7.

Figs. 11 and 12 are two horizontal sections made respectively according to lines 11—11 and 12—12 of Fig. 8.

Figure 6:
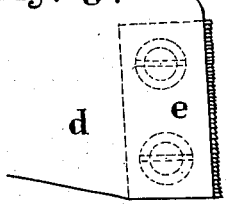
Fig. 6 is a view, on an enlarged scale, of the movable blade.

As illustrated in the drawing, the shears forming the subject-matter of the invention comprise a frame $a$ provided with two handles $b^1$ and $b^2$ which allow to easily take hold of the apparatus. This frame $a$ has two cheeks $c^1$ $c^2$ the opposite faces of which are machined so as to guide the blade-carrier $d$ on which is obliquely secured the movable blade $e$. As shown in the drawing, Fig. 6, this blade is provided with small teeth which are oblique in the direction of the feeding movement of the sheet-iron plate. These teeth are not indispensable, but facilitate the operation as will be explained hereafter.

The blade-carrier is mounted on a shaft $f$ the bearings of which in the cheeks $c^1$, $c^2$ are out of center relatively to the bearing in the blade-carrier $d$. The diameters of these bearings decrease from right to left (Fig. 3), so as to permit the assemblage and disassemblage. A conical pin $g$ fitted in a groove $h$ provided in the shaft $f$, or any other suitable device, holds the latter in place. This shaft terminates in two squares or other bearings which allow to actuate it by a suitable means, a flexible transmission for instance.

The blade-carrier $d$ terminates on the opposite side of the blade in a cylindrical tailpiece $i$ fitted in a corresponding hole formed in a shaft $j$, of large diameter, which can rock in two holes provided in the cheeks $c^1$ and $c^2$.

The frame $a$ terminates at the bottom in an incline $k$. It carries at this end a kind of hook $l$ separated from the cheek $c^1$ by a groove $m$.

On this hook is obliquely secured the fixed blade $n$. The incline $k$ and the slot $m$ both begin or start from the fixed blade $n$ so that the two portions of the cut sheet-iron plate can be disengaged without being distorted.

Figure 1:
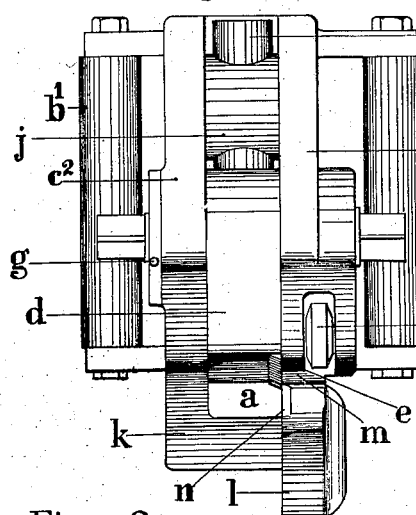
Fig. 1 is a front view.
Figure 2:
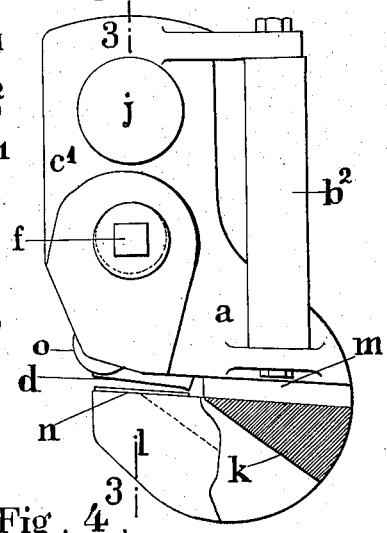
Fig. 2 is a side view, the frame being partially cut away.
Figure 3:
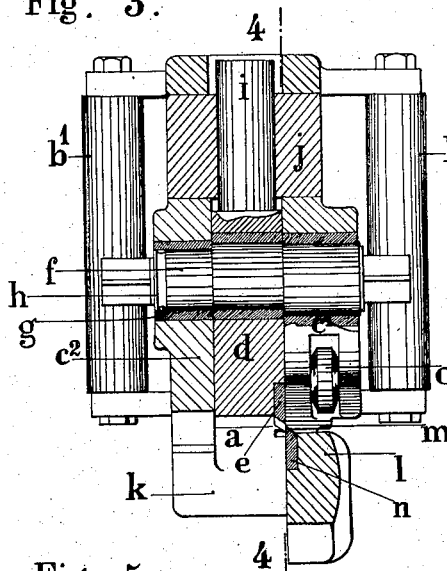
Fig. 3 is a section made according to line 3—3 of Fig. 2.
Figure 4:
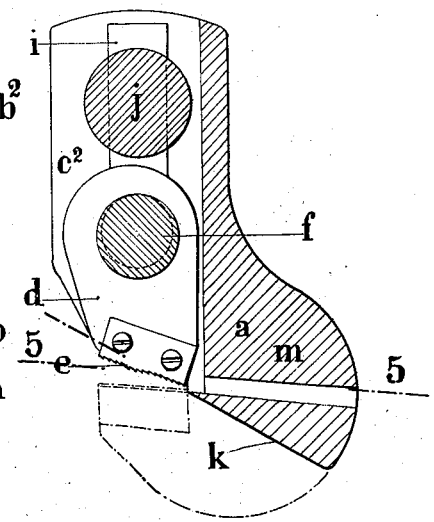
Fig. 4 is a section according to line 4—4 of Fig. 3.
Figure 5:
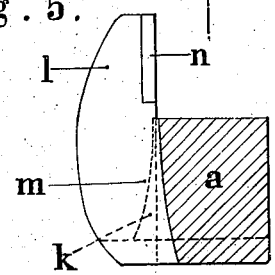
Fig. 5 is a sectional plan view according to line 5—5 of Fig. 4.

On the other hand, the bottom of the slot $m$ and the edge of the incline $k$ are curved, as shown in Figs. 3 and 5 in order to allow of cutting according to curved outlines. A roller $o$ acts as a rotary bearing.

In the form of construction illustrated in Figs. 7 to 11, the shears comprises, as in the previous example, a frame $a$ which, provided with two handles $b^1$, $b^2$ permitting to grasp and guide the apparatus, presents two cheeks $c^1$, $c^2$ machined on their inner face between which is guided the blade-carrier $d$ on which is obliquely secured the movable blade $e$.

This blade-carrier is formed of a flat steel member the dimensions and shape of which are approximately similar to those of the cheeks $c^1$, $c^2$ and the plane faces of which, in contact with these latter are perfectly machined so as to ensure the guiding and displacement of the blade $e$ in the same plane.

The blade-carrier is mounted by means of a ball-bearing $f^1$ on the central bearing of a shaft $f$, which is out of centre relatively to the end bearings mounted in ball-bearings $f^2$ arranged in the cheeks $c^1$, $c^2$ of the frame.

In this form of construction, the blade-carrier $d$ forms at the rear an extension $i^1$ in which is provided a rectilinear slide-way $i^2$ which fits on the flat portion $j^1$ of a shaft $j$ capable of freely rocking in two holes formed in the cheeks $c^1$, $c^2$, below the shaft $f$ the rotation of which produces the displacement of the movable blade $e$.

The shaft $j$, which forms the axis of oscillation of the movable blade, is situated, at the rear and slightly below the axis of rotation of the driving shaft $f$, so that the elliptical movement of the movable blade is such that the large axis of the ellipse is directed in the same direction as the edge of the blade and that the movement of translation of the tool is thus the maximum.

At its lower part, the frame $a$ is provided with a kind of hook $l$ at the end of which is secured the fixed blade $n$ and which is separated from the cheek $c^1$ by a longitudinal slot $m$ below which is formed a second longitudinal slot $m^1$ open on the opposite face of the hook $l$ and the upper bottom of which is connected with the base of the cheek $c^2$.

The vertical wall of each of these slots is curved and these two superposed faces are, as shown respectively in Figs. 11 and 12, symmetrically arranged relatively to the cutting plane of the tool and have their point of tangency slightly in front of the apex of the angle formed by the two blades, for the purpose of thus constituting two surfaces of disengagement and of allowing the workman to turn the tool in both directions and in very small radii during its displacement on the material to be cut, for cutting out in this latter curved outlines; the two convergent slots forming an angle opposed at the apex to the cutting angle of the blades so as to release the sheet-iron plates without distorting the same during the cutting operation.

The operation of the shears is the following:

The shaft $f$ being actuated with a rotary movement by means of a suitable transmission such for instance as a flexible transmission provided with an internally screw-threaded sleeve fitted on the suitably screw-threaded end $f^3$ of the said shaft $f$, this latter acting in the same way as a crank shaft, drives the movable blade $e$ parallel to itself with an approximately elliptical movement resulting, as above stated, from the two following simultaneous movements:

1°. Vertical reciprocating movement during which the cutting operation is effected;

2°. Reciprocating movement in the direction of advance and recoil of the tool determining the translation of the shears on the material to be cut; the inclined teeth of the movable blade $e$ taking a bearing, during the displacement towards the right on the sheet-iron plate and thus causing the shears to advance, the said teeth being disengaged during the displacement towards the left, the shears thus remaining stationary.

As will be understood from the foregoing, the automatic advance or feed of the shears is obtained, according to the invention, by a very simple mechanism. The workman who uses these shears contrarily to what he is compelled to do with the shears actually in use, has only to guide his tool and the work is much less tiring for him.

On the other hand, by using, as shown, a short blade and by providing for the sheet-iron plate curved portions on the frame of the shears, it can be employed for cutting according to any curved outlines.

Finally, the forms of construction described with reference to the accompanying drawing are particularly strong and allow to manufacture shears, of very reduced weight and volume permitting to cut relatively thick sheet-iron plates; the mechanism of the invention may obviously be applied to the manufacture of fixed shears, the material to be cut being then driven by the movable blade.

Without altering the principle of the invention, the fixed blade can be replaced by a knurling tool or portion of knurling tool and any improvement can be made in the construction, such for instance as the interposition of ball-bearings between the rotating parts and the fixed parts.

Finally, it is possible to manufacture, according to the principle of the invention, shears adapted to cut any sheet material other than sheet-iron (sheet metals, fibres, card-board, leather, etc. . .) capable of being cut by the crossing of two blades.

The above arrangements are, of course, given by way of example only; the forms, proportions and dimensions may vary according to circumstances without departing from the principle of the invention.

Claims:—

1. A shears for cutting sheet-iron plates and other materials comprising: a frame,—guide handles,—two parallel cheeks formed in the said frame,—a hook at the base of the frame,—a fixed blade of the shears, obliquely secured at the end of this hook,—a driving shaft journalled in the said cheeks,—a central eccentric bearing on the said shaft and situated in the interval separating the said cheeks,—a blade-carrier mounted on the central bearing of the driving shaft and receiving from the latter a reciprocating movement moving it towards and from the fixed blade,—a movable blade secured in an inclined position at the base of this blade-carrier,—means for imparting to this movable blade, simultaneously with the above reciprocating movement, a reciprocating movement in the direction of advance and recoil of the shears,—means permitting to turn the shears, during the cutting operation, on the material to be cut, in very small radii for cutting out curved outlines,—means for guiding and releasing the material cut without distorting the same.

2. A shears for cutting sheet-iron plates and other materials comprising: a frame, guide handles,—two parallel cheeks formed in the said frame,—a hook at the base of the frame,—a fixed blade of the shears, obliquely secured at the end of this hook,—a driving shaft journalled in the said cheeks,—a central eccentric bearing on the said shaft and situated in the interval separating the said cheeks,—a blade-carrier mounted on the central bearing of the driving shaft and receiving from the latter a reciprocating movement moving it towards and from the fixed blade,—a movable blade secured in an inclined position at the base of this blade-carrier,—a second shaft, parallel to the driving shaft and rocking in the cheeks of the frame,—an extension of the movable blade-carrier engaging with this second rocking shaft and sliding on the latter,—means permitting to turn the shears, during the cutting operation, on the material to be cut, in very small radii for cutting out curved outlines,—means for guiding and releasing the material cut without distorting the same.

3. A shears for cutting sheet-iron plates and other materials comprising: a frame,—guide handles,—two parallel cheeks formed in the said frame,—a hook at the base of the frame,—a fixed blade of the shears, obliquely secured at the end of this hook,—a driving shaft journalled in the said cheeks,—a central eccentric bearing on the said shaft and situated in the interval separating the said cheeks, a blade-carrier mounted on the central bearing of the driving shaft and receiving from the latter a reciprocating movement moving it towards and from the fixed blade,—a movable blade secured in an inclined position at the base of this blade-carrier,—a second shaft, parallel to the driving shaft and rocking in the cheeks of the frame,—an extension of the movable blade-carrier engaging with this second rocking shaft and sliding on the latter,—said frame being provided with two superposed grooves,—a vertical wall, curved in the bottom of these grooves, the said vertical walls being symmetrically arranged relatively to the vertical middle plane of the shears, with point of tangency slightly in front of the apex of the angle formed by the two blades of the shears,—means for guiding and releasing the material cut without distorting the same.

4. A shears for cutting sheet-iron plates and other materials comprising: a frame,—guide handles,—two parallel cheeks formed in the said frame,—a hook at the base of the frame,—a fixed blade of the shears, obliquely secured at the end of this hook,—a driving shaft journalled in the said cheeks,—a central eccentric bearing on the said shaft and situated in the interval separating the said cheeks, a blade-carrier mounted on the central bearing of the driving shaft and receiving from the latter a reciprocating movement moving it towards and from the fixed blade,—a movable blade secured in an inclined position at the base of this blade-carrier,—a second shaft, parallel to the driving shaft and rocking in the cheeks of the frame,—an extension of the movable blade-carrier engaging with this second rocking shaft and imparting to the movable blade, simultaneously with the reciprocating movement moving it towards and from the fixed blade, a reciprocating movement of advance and recoil,—said frame being provided with two superposed grooves,—a vertical wall, curved in the bottom of these grooves, the said vertical walls being symmetrically arranged relatively to the vertical middle plane of the shears, with point of tangency slightly in front of the apex of the angle formed by the two blades of the shears,—these two grooves permitting to turn the shears on the material to be cut for obtaining the cutting out of curved outlines, the said grooves forming together an angle opposed at the apex to the cutting angle of the blades for allowing to release the material cut and to avoid its distortion.

The foregoing specification of our "shears" signed by us this 16th day of October, 1922.

HUBERT GASTON RAPHAEL VULLIET.
FRANCOIS ALEXIS HENRI DESCHÂTRES.